United States Patent
Dillen

(10) Patent No.: US 12,299,823 B2
(45) Date of Patent: May 13, 2025

(54) AUDIOVISUAL RENDERING APPARATUS AND METHOD OF OPERATION THEREFOR

(71) Applicant: KONINKLIJKE PHILIPS N.V., Eindhoven (NL)

(72) Inventor: Paulus Henricus Antonius Dillen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 214 days.

(21) Appl. No.: 18/029,924

(22) PCT Filed: Oct. 11, 2021

(86) PCT No.: PCT/EP2021/078039
§ 371 (c)(1),
(2) Date: Apr. 3, 2023

(87) PCT Pub. No.: WO2022/078952
PCT Pub. Date: Apr. 21, 2022

(65) Prior Publication Data
US 2023/0377276 A1    Nov. 23, 2023

(30) Foreign Application Priority Data
Oct. 13, 2020 (EP) .................... 20201448

(51) Int. Cl.
*G06T 19/00*    (2011.01)
*G06F 3/01*    (2006.01)
(Continued)

(52) U.S. Cl.
CPC .......... *G06T 19/003* (2013.01); *G06F 3/012* (2013.01); *G06T 7/70* (2017.01); *G06T 19/006* (2013.01); *H04S 7/304* (2013.01)

(58) Field of Classification Search
CPC ....... G06T 7/70; G06T 19/006; G06T 19/003; G06F 3/012; G06F 3/011; H04S 7/304;
(Continued)

(56) References Cited

U.S. PATENT DOCUMENTS

| 5,959,597 A | 9/1999 | Yamada et al. |
| 10,015,620 B2 | 7/2018 | Dillen et al. |

(Continued)

FOREIGN PATENT DOCUMENTS

| WO | 2019141900 A1 | 7/2019 |
| WO | 2020012067 A1 | 1/2020 |

OTHER PUBLICATIONS

3GPP SP-170611 'New WID on EVS Codec Extension for Immersive Voice and Audio Services' 3GPP TSG Meeting Sapporo Japan, Jun. 26-30, 2017.
(Continued)

*Primary Examiner* — Xilin Guo

(57) ABSTRACT

An audiovisual rendering apparatus comprises a receiver (201) receiving audiovisual items and a receiver (209) receives metadata comprising input poses provided with reference to an input coordinate system and rendering category indications indicating a rendering category. A receiver (213) receives user head movement data and a mapper (211) maps the input poses to rendering poses in a rendering coordinate system in response to the user head movement data. A renderer (203) renders the audiovisual items using the rendering poses. Each rendering category is linked with a different coordinate system transform from a real world coordinate system to a category coordinate system, at least one of which is variable with respect to the real world coordinate system and the rendering coordinate system. The mapper selects a rendering category for an audiovisual item in response to a rendering category indication and maps an input pose to rendering poses that correspond to fixed poses
(Continued)

in a category coordinate system for varying user head movement where the category coordinate system is determined from the coordinate system transform of the rendering category.

20 Claims, 7 Drawing Sheets

(51) Int. Cl.
*G06T 7/70* (2017.01)
*H04S 7/00* (2006.01)

(58) Field of Classification Search
CPC ............. H04S 2400/11; H04S 2420/01; H04R 2499/15
See application file for complete search history.

(56) References Cited

U.S. PATENT DOCUMENTS

| | | | |
|---|---|---|---|
| 2019/0215638 A1 | 7/2019 | Stein et al. | |
| 2020/0344563 A1* | 10/2020 | Mate | G06F 3/167 |
| 2021/0201855 A1* | 7/2021 | Kammachi-Sreedhar | H04N 13/183 |
| 2021/0405743 A1* | 12/2021 | Boesel | G06N 3/08 |
| 2021/0409888 A1* | 12/2021 | Schevciw | H04R 5/04 |
| 2022/0022000 A1* | 1/2022 | Bruhn | H04R 3/005 |
| 2022/0103962 A1* | 3/2022 | Munoz | G06F 3/167 |
| 2022/0279303 A1* | 9/2022 | Marculescu | H04R 5/033 |

OTHER PUBLICATIONS

International Search Report and Written Opinion from PCT/EP2021/078039 mailed Jan. 31, 2022.

\* cited by examiner

AUDIOVISUAL RENDERING APPARATUS AND METHOD OF OPERATION THEREFOR

CROSS-REFERENCE TO PRIOR APPLICATIONS

This application is the U.S. National Phase application under 35 U.S.C. § 371 of International Application No. PCT/EP2021/078039, filed on Oct. 11, 2021, which claims the benefit of EP Patent Application No. EP 20201448.6, filed on Oct. 13, 2020. These applications are hereby incorporated by reference herein.

FIELD OF THE INVENTION

The invention relates to an audiovisual rendering apparatus and method of operation therefor, and in particular, but not exclusively, to using such to support e.g. an Augmented/Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene (including both objects that are currently visible and objects that are not currently visible (e.g. behind the user)). Thus, the audio and video scenes are preferably perceived to be consistent and with both providing a full spatial experience.

For audio, the focus has until now mostly been on headphone reproduction using binaural audio rendering technology. In many scenarios, headphone reproduction enables a highly immersive, personalized experience to the user. Using headtracking, the rendering can be made responsive to the user's head movements, which highly increases the sense of immersion.

For the purpose of Immersive Voice and Audio Services (IVAS), the 3GPP consortium develops the so-called IVAS codec (3GPP SP-170611 'New WID on EVS Codec Extension for Immersive Voice and Audio Services'). This codec comprises a renderer to translate various audio streams into a form suited for reproduction at the receiving end. In particular, audio can be rendered to a binaural format for reproduction via headphones or head mounted VR devices with built in headphones.

In many such applications, a rendering device may receive input data describing a three dimension audio and/or visual scene, and the renderer may be arranged to render this data such that a user is provided with an audiovisual experience that provides a perception of the three dimensional scene.

However, providing a suitable experience is a challenging prospect in many applications and especially adapting the rendering in response to head movements such that a desirable experience is provided to the user is challenging.

For example, it is known that human perception of direction and distance of sound sources is not only due to the (typically different) delay and filtering of the sound from source to both ears, but also to a large extent to how these vary with head movements such as rotations. Similarly, parallax and similar movement of visual objects provides strong three dimensional visual cues. Unconsciously, since we (often subtly) move and wiggle our head in daily life, the sound changes in similarly subtle but definite ways, and this adds significantly to the immersive 'around us' hearing/seeing experience that we are used to.

Experiments with headphones reproduction have shown that, even if the sound paths from a sound source to ears are adequately modelled by filters, by making these static (i.e. by the lack of head movement related changes), the immersive experience is reduced and the sound can tend to seem 'inside our head'.

Therefore, to create the impression of an immersive virtual world, some applications have been developed that render audio sources and/or visual objects at positions that are perceived to be fixed with respect to the real world. However, this is a challenging operation to do optimally and may not always lead to a desired user experience. In some applications, a three dimensional scene is presented that follows head movement, and thus which appear fixed with respect to the user's head. This may be a desirable experience in many applications but may provide an unnatural experience in other applications and may for example not allow an immersive experience of "being present" in the virtual scene. U.S. Ser. No. 10/015,620B2 discloses another example where audio is rendered with respect to a reference orientation representing the user.

However, whereas such applications may provide suitable user experiences in many embodiments they tend to not provide optimal or even desired user experiences for some applications.

Hence, an improved approach for rendering of audiovisual items, in particular for a virtual/augmented/mixed reality experience/application, would be advantageous. In particular, an approach that allows improved operation, increased flexibility, reduced complexity, facilitated implementation, an improved user experience, a more consistent perception of an audio and/or visual scene, improved customization, improved personalization; an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audiovisual rendering apparatus comprising: a first receiver arranged to receive audiovisual items; a metadata receiver arranged to receive meta data comprising input poses and rendering category indications for each of at least some of the audiovisual items, the input poses being provided with reference to an input coordinate system and the rendering category indications indicating a rendering category from a set of rendering categories; a receiver arranged to receive user head movement data indicative of head movement of a user; a mapper arranged to map the input poses to rendering poses in a rendering coordinate system in response to the user head movement data, the rendering coordinate system being fixed with respect to the head movement; a renderer arranged to render the audiovisual items using the rendering poses; wherein each rendering category is linked with a coordinate system transform from a real world coordinate system to a category coordinate system, the coordinate system transform being different for different categories and at least one category coordinate system being variable with respect to the real world coordinate system and the rendering coordinate system; and the mapper is arranged to select a first rendering category from the set of rendering categories for a first audiovisual item in response to a rendering category indication for the first audiovisual item, and to map an input pose for the first audiovisual item to rendering poses in the rendering coordinate system that correspond to fixed poses in a first category coordinate system for varying user head movement, the first category coordinate system being determined from a first coordinate system transform for the first rendering category.

The approach may provide an improved user experience in many embodiments and may specifically provide an improved user experience for many virtual reality (including augmented and mixed reality) applications, including specifically social or shared experiences. The approach may provide a very flexible approach where the rendering operation and spatial perception of audiovisual items may be individually adapted to the individual audiovisual items. The approach may e.g. allow some audiovisual items to be rendered to appear fully fixed with respect to the real world, some audiovisual items to be rendered to appear fully fixed to the user (following user head movements), and some audiovisual items to be rendered to appear both fixed in the real world for some movements and following the user for other movements. The approach may in many embodiments allow a flexible rendering where an audiovisual item is perceived to substantially follow the user yet may still provide a spatial out-of-the-head experience of the audiovisual item.

The approach may reduce complexity and resource requirements in many embodiments and may in many embodiments allow source side control of rendering operations.

The rendering category may be indicative of whether the audiovisual item represents an audio source with a spatial property that is fixed to head orientation or is not-fixed to head orientation (corresponding listener pose dependent position and listener pose non-dependent position respectively). The rendering category may be indicative of whether the audio element is diegetic or not.

In many embodiments, the mapper may further arranged to select a second rendering category from the set of rendering categories for a second audiovisual item in response to a rendering category indication for the second audiovisual item, and to map an input pose for the first audiovisual item to rendering poses in the rendering coordinate system that correspond to fixed poses in a second category coordinate system for varying user head movement, the second category coordinate system being determined from a second coordinate system transform for the second rendering category. The mapper may similarly be arranged to perform such operations for a third, fourth, fifth, etc. audiovisual item.

An audiovisual item may be an audio item and/or a visual/video/image/scene item. The audiovisual item may be a visual or audio representation of a scene object of a scene represented by the audiovisual items. The term audiovisual item may in some embodiments be replaced by the term audio item (or element). The term audiovisual item may in some embodiments be replaced by the term visual item (or scene object).

In many embodiments, the renderer may be arranged to generate output binaural audio signals for a binaural rendering device by applying a binaural rendering to the audiovisual items (being audio items) using the rendering poses.

The term pose may represent a position and/or orientation. The term "pose" may in some embodiments be replaced by the term "position". The term "pose" may in some embodiments be replaced by the term "orientation". The term "pose" may in some embodiments be replaced by the term "position and orientation".

The receiver may be arranged to receive real world user head movement data with reference to a real world coordinate system indicative of a head movement of a user.

The renderer arranged to render the audiovisual items using the rendering poses with the audiovisual items being referenced/located in the rendering coordinate system.

The mapper may be arranged to map an input pose for the first audiovisual item to rendering poses in the rendering coordinate system that correspond to fixed poses in a first category coordinate system for the head movement data being indicative of different varying user head movement.

In some embodiments, the rendering category indications are indicative of a source type, such as an audio type for an audio item or a scene object type for a visual element.

This may provide an improved user experience in many embodiments. The rendering category indications may be indicative of an audio source type from a set of audio source types including at least one audio source type from the group of: speech audio; music audio; foreground audio; background audio; voice over audio; and narrator audio.

In accordance with an optional feature of the invention, a second coordinate system transform for a second category is such that a category coordinate system for the second category is aligned with the user head movement.

This may provide an improved user experience and/or improved performance and/or facilitated implementation in many embodiments. It may in particular support that some audiovisual items may appear to be fixed with respect to the user's head whereas others are not.

In accordance with an optional feature of the invention, a third coordinate system transform for a third category is such that a category coordinate system for the third category is aligned with the real world coordinate system.

This may provide an improved user experience and/or improved performance and/or facilitated implementation in many embodiments. It may in particular support that some audiovisual items may appear to be fixed with respect to the real world whereas others are not.

In accordance with an optional feature of the invention, the first coordinate system transform is dependent on the user head movement data.

This may provide an improved user experience and/or improved performance and/or facilitated implementation in many embodiments. It may in particular in some applications provide a very advantageous experience where the audiovisual item pose follows to the user's overall movements but not smaller/faster head movements thereby providing an improved user experience with an improved out-of-the-head experience.

In accordance with an optional feature of the invention, wherein the first coordinate system transform is dependent on an average head pose.

In accordance with an optional feature of the invention, the first coordinate system transform aligns the first category coordinate system with an average head pose.

In accordance with an optional feature of the invention, a different coordinate system transform for a different rendering category is dependent on the user head movement data, the dependency on the user head movement for the first coordinate system transform and the different coordinate system transform having different temporal averaging properties.

In accordance with an optional feature of the invention, the audiovisual rendering apparatus comprises a receiver for receiving user torso pose data indicative of a user torso pose, and the first coordinate system transform is dependent on the user torso pose data.

This may provide an improved user experience and/or improved performance and/or facilitated implementation in many embodiments. It may in particular in some applications provide a very advantageous experience where the audiovisual item pose follows to the user's overall movements but not smaller/faster head movements thereby providing an improved user experience with an improved out-of-the-head experience.

In accordance with an optional feature of the invention, the first coordinate system transform is dependent on an average torso pose.

In accordance with an optional feature of the invention, the first coordinate system transform aligns the first category coordinate system with a user torso pose.

In accordance with an optional feature of the invention, the audiovisual rendering apparatus further comprises a receiver for receiving device pose data indicative of a pose of an external device, and the first coordinate system transform is dependent on the device pose data.

This may provide an improved user experience and/or improved performance and/or facilitated implementation in many embodiments. It may in particular in some applications provide a very advantageous experience where the audiovisual item pose follows to the user's overall movements but not smaller/faster head movements thereby providing an improved user experience with an improved out-of-the-head experience.

In accordance with an optional feature of the invention, the first coordinate system transform is dependent on an average device pose.

In accordance with an optional feature of the invention, the first coordinate system transform aligns the first category coordinate system with a device pose.

In accordance with an optional feature of the invention, the mapper is arranged to select the first rendering category in response to a user movement parameter indicative of a movement of the user.

In accordance with an optional feature of the invention, the mapper is arranged to determine a coordinate system transform between the real world coordinate system and a coordinate system for the user head movement data in response to a user movement parameter indicative of a movement of the user.

In accordance with an optional feature of the invention, the mapper is arranged to determine the user movement parameter in response to the user head movement data.

In accordance with an optional feature of the invention, at least some rendering category indications are indicative of whether the audiovisual items for the at least some rendering category indications are diegetic or non-diegetic audiovisual items.

In accordance with an optional feature of the invention, the audiovisual items are audio items and the renderer is arranged to generate output binaural audio signals for a binaural rendering device by applying a binaural rendering to the audio items using the rendering poses.

In accordance with another aspect of the invention, there is provided a method of rendering audiovisual items, the method comprising: receiving audiovisual items; receiving meta data comprising input poses and rendering category indications for each of at least some of the audiovisual items, the input poses being provided with reference to an input coordinate system and the rendering category indications indicating a rendering category from a set of rendering categories; receiving user head movement data indicative of head movement of a user; mapping the input poses to rendering poses in a rendering coordinate system in response to the user head movement data, the rendering coordinate system being fixed with respect to the head movement; rendering the audiovisual items using the rendering poses;

wherein each rendering category is linked with a coordinate system transform from a real world coordinate system to a category coordinate system, the coordinate system transform being different for different categories and at least one category coordinate system being variable with respect to the real world coordinate system and the rendering coordinate system; and the method includes selecting a first rendering category from the set of rendering categories for a first audiovisual item in response to a rendering category indication for the first audiovisual item, and to map an input pose for the first audiovisual item to rendering poses in the rendering coordinate system that correspond to fixed poses in a first category coordinate system for varying user head movement, the first category coordinate system being determined from a first coordinate system transform for the first rendering category.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
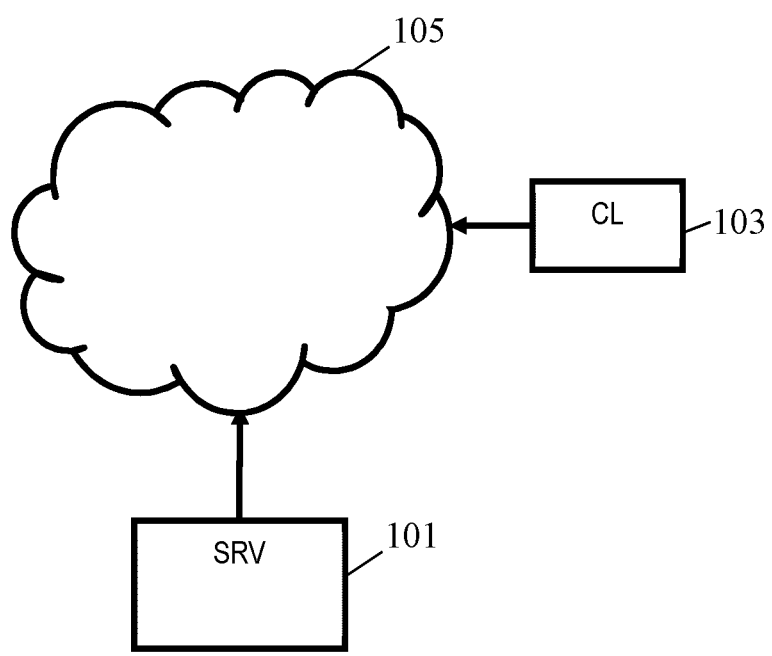
FIG. 1 illustrates an example of a client server based virtual reality system.

The following description will focus on embodiments where audiovisual items including both audio items and visual items are presented by a rendering that includes both audio rendering and visual rendering. However, it will be appreciated that the described approaches and principles may also be applied individually and separately to e.g. only audio rendering of audio items or only video/visual/image rendering of visual items, such as visual objects in a video scene.

The description will also focus on virtual reality applications although it will be appreciated that the described approaches may be used in many other applications, including augmented and mixed reality applications.

Virtual reality (including augmented and mixed reality) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise up to six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. As audio sources may be static in the scene, changes in the user pose will result in a change in the relative position of the audio source with respect to the user's pose. Accordingly, the spatial perception of the audio source may change to reflect the new position relative to the user. The audio rendering may accordingly be adapted depending on the user pose.

The viewer or user pose input may be determined in different ways in different applications. In many embodiments, the physical movement of a user may be tracked directly. For example, a camera surveying a user area may detect and track the user's head (or even eyes (eye-tracking)). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position and orientation of the VR headset.

In some systems, the VR application may be provided locally to a viewer by e.g. a standalone device that does not use, or even have any access to, any remote VR data or processing. For example, a device such as a games console may comprise a store for storing the scene data, input for receiving/generating the viewer pose, and a processor for generating the corresponding images and(/or) audio from the scene data.

In other systems, the VR/scene data may be provided from a remote device or server.

For example, a remote device may generate audio data representing an audio scene and may transmit audio components/objects/signals or other audio elements corresponding to different audio sources in the audio scene together with position information indicative of the position of these (which may e.g. dynamically change for moving objects). The audio elements may include elements associated with specific positions but may also include elements for more distributed or diffuse audio sources. For example, audio elements may be provided representing generic (non-localized) background sound, ambient sound, diffuse reverberation etc.

The local VR device may then render the audio elements appropriately, e.g. by applying appropriate binaural processing reflecting the relative position of the audio sources for the audio components.

Similarly, a remote device may generate visual/video data representing a visual audio scene and may transmit visual scene components/objects/signals or other visual elements corresponding to different objects in the visual scene together with position information indicative of the position of these (which may e.g. dynamically change for moving objects). The visual items may include elements associated with specific positions but may also include video items for more distributed sources.

In some embodiments, the visual items may be provided as individual and separate items, such as e.g. as descriptions of individual scene objects (e.g. dimensions, texture, opaqueness, reflectivity etc.). Alternatively or additionally, visual items may be represented as part of an overall model of the scene e.g. including descriptions of different objects and their relationship to each other.

For a VR service, a central server may accordingly in some embodiments generate audiovisual data representing a three dimensional scene, and may specifically represent the audio by a number of audio items and the visual scene by a number of video items that can be rendered by the local client/device.

FIG. 1 illustrates an example of a VR system in which a central server 101 liaises with a number of remote clients 103 e.g. via a network 105, such as e.g. the Internet. The central server 101 may be arranged to simultaneously support a potentially large number of remote clients 103.

Such an approach may in many scenarios provide an improved trade-off e.g. between complexity and resource demands for different devices, communication requirements etc. For example, the scene data may be transmitted only once or relatively infrequently with the local rendering device (the remote client 103) receiving a viewer pose and locally processing the scene data to render audio and/or video to reflect changes in the viewer pose. This approach may provide an efficient system and attractive user experience. It may for example substantially reduce the required communication bandwidth while providing a low latency real time experience while allowing the scene data to be centrally stored, generated, and maintained. It may for example be suitable for applications where a VR experience is provided to a plurality of remote devices.

Figure 2:
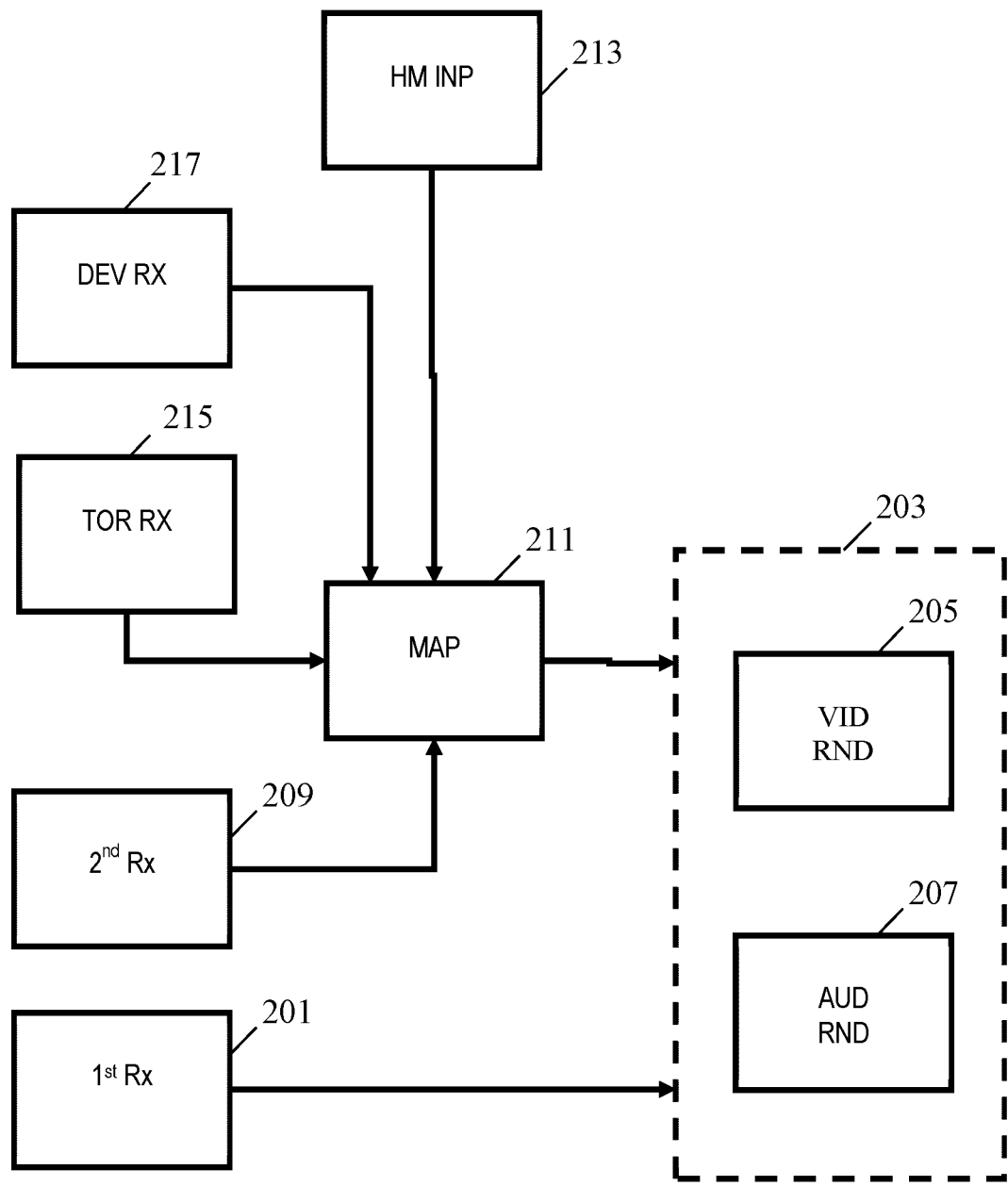
FIG. 2 illustrates an example of elements of an audiovisual rendering apparatus in accordance with some embodiments of the invention.

FIG. 2 illustrates elements of an audiovisual rendering apparatus which may provide an improved audiovisual rendering in many applications and scenarios. In particular, the audiovisual rendering apparatus may provide improved rendering for many VR applications, and the audiovisual rendering apparatus may specifically be arranged to perform the processing and rendering for a VR client 103 of FIG. 1.

The audio apparatus of FIG. 2 is arranged to render a three dimensional scene by rendering spatial audio and video to provide three dimensional perception of the scene. The specific description of the audiovisual rendering apparatus will focus on an application that provides the described approach to both audio and video but it will be appreciated that in other embodiments the approach may be applied only to audio or video/visual processing, and indeed in some embodiments the rendering apparatus may comprise functionality only for rendering audio or only for rendering video, i.e. the audiovisual rendering apparatus may be any audio rendering apparatus or any video rendering apparatus.

The audiovisual rendering apparatus comprises a first receiver 201 which is arranged to receive audiovisual items from a local or remote source. In the specific example, the first receiver 201 receives data describing the audiovisual items from the server 101. The first receiver 201 may be arranged to receive data describing the virtual scene. The data may include data providing a visual description of the scene and may include data providing an audio description of the scene. Thus, an audio scene description and a visual scene description may be provided by the received data.

The audio items may be encoded audio data, such as encoded audio signals. The audio items may be different types of audio elements including different types of signals and components, and indeed in many embodiments the first receiver 201 may receive audio data which defines different types/formats of audio. For example, the audio data may include audio represented by audio channel signals, individual audio objects, scene based audio such as Higher Order Ambisonics (HOA) etc. The audio may for example be represented as encoded audio for a given audio component that is to be rendered.

The first receiver 201 is coupled to a renderer 203 which proceeds to render the scene based on the received data describing the audiovisual items. In case of encoded data, the renderer 203 may also be arranged to decode the data (or in some embodiments decoding may be performed by the first receiver 201).

Specifically, the renderer 203 may comprise an image renderer 205 which is arranged to generate images corresponding to a viewer's current viewing pose. For example, the data may include spatial 3D image data (e.g. images and depth or a model description of the scene) and from this the visual renderer 203 may generate stereo images (image for the left and right eyes of a user) as will be known to the skilled person. The images may be presented to the user e.g. via individual left and right eye displays of a VR headset.

The renderer 203 further comprises an audio renderer 207 which is arranged to render the audio scene by generating audio signals based on the audio items. In the example, the audio renderer 207 is a binaural audio renderer which generates binaural audio signals for a left and right ear of a user. The binaural audio signals are generated to provide a desired spatial experience and are typically reproduced by headphones or earphones that specifically may be part of a headset worn by a user, the headset also comprising the left and right eye displays.

Thus, in many embodiments, the audio rendering by the audio renderer 207 is a binaural render process using suitable binaural transfer functions to provide the desired spatial effect for a user wearing a headphone. For example, the audio renderer 207 may be arranged to generate an audio component to be perceived to arrive from a specific position using binaural processing.

Binaural processing is known to be used to provide a spatial experience by virtual positioning of sound sources using individual signals for the listener's ears. With an appropriate binaural rendering processing, the signals required at the eardrums in order for the listener to perceive sound from any desired direction can be calculated, and the signals can be rendered such that they provide the desired effect. These signals are then recreated at the eardrum using either headphones or a crosstalk cancelation method (suitable for rendering over closely spaced speakers). Binaural rendering can be considered to be an approach for generating signals for the ears of a listener resulting in tricking the human auditory system into perceiving that a sound is coming from the desired positions.

The binaural rendering is based on binaural transfer functions which vary from person to person due to the acoustic properties of the head, ears and reflective surfaces, such as the shoulders. For example, binaural filters can be used to create a binaural recording simulating multiple sources at various locations. This can be realized by convolving each sound source with the pair of e.g. Head Related Impulse Responses (HRIRs) that correspond to the position of the sound source.

A well-known method to determine binaural transfer functions is binaural recording. It is a method of recording sound that uses a dedicated microphone arrangement and is intended for replay using headphones. The recording is made by either placing microphones in the ear canal of a subject or using a dummy head with built-in microphones, a bust that includes pinnae (outer ears). The use of such dummy head including pinnae provides a very similar spatial impression as if the person listening to the recordings was present during the recording.

By measuring e.g. the responses from a sound source at a specific location in 2D or 3D space to microphones placed in or near the human ears, the appropriate binaural filters can be determined. Based on such measurements, binaural filters reflecting the acoustic transfer functions to the user's ears can be generated. The binaural filters can be used to create a binaural recording simulating multiple sources at various locations. This can be realized e.g. by convolving each sound source with the pair of measured impulse responses for a desired position of the sound source. In order to create the illusion that a sound source is moving around the listener, a large number of binaural filters is typically required with a certain spatial resolution, e.g. 10 degrees.

The head related binaural transfer functions may be represented e.g. as Head Related Impulse Responses (HRIR), or equivalently as Head Related Transfer Functions (HRTFs) or, Binaural Room Impulse Responses (BRIRs), or Binaural Room Transfer Functions (BRTFs). The (e.g. estimated or assumed) transfer function from a given position to the listener's ears (or eardrums) may for example be given in the frequency domain in which case it is typically referred to as an HRTF or BRTF, or in the time domain in which case it is typically referred to as a HRIR or BRIR. In some scenarios, the head related binaural transfer functions are determined to include aspects or properties of the acoustic environment and specifically of the room in which the measurements are made, whereas in other examples only the user characteristics are considered. Examples of the first type of functions are the BRIRs and BRTFs.

The audio renderer 207 may accordingly comprise a store with binaural transfer functions for a, typically high, number of different positions with each binaural transfer function providing information of how an audio signal should be processed/filtered in order to be perceived to originate from that position. Individually applying binaural processing to a plurality of audio signals/sources and combining the result may be used to generate an audio scene with a number of audio sources positioned at appropriate positions in the sound stage.

The audio renderer 207 may for a given audio element that is to be perceived to originate from a given position relative to the user's head, select and retrieve the stored binaural transfer function that most closely matches the desired position (or in some case may generate this by interpolating between a plurality of close binaural transfer functions). It may then apply the selected binaural transfer function to the audio signal of the audio element thereby generating an audio signal for the left ear and an audio signal for the right ear.

The generated output stereo signal in the form of the left and right ear signal is then suitable for headphone rendering and may be amplified to generate drive signals that are fed to the headset of a user. The user will then perceive the audio element to originate from the desired position.

It will be appreciated that the audio items may in some embodiments also be processed to e.g. add acoustic environment effects. For example, the audio item may be processed to add reverberation or e.g. decorrelation/diffuseness. In many embodiments, this processing may be performed on the generated binaural signal rather than directly on the audio element signal.

Thus, the audio renderer 207 may be arranged to generate the audio signals such that a given audio element is rendered such that a user wearing the headphones perceives the audio element to be received from a desired position. Other audio items may e.g. possibly be distributed and diffused and may be rendered as such.

It will be appreciated that many algorithms and approaches for rendering of spatial audio, e.g. using headphones, and specifically for binaural rendering, will be known to the skilled person and that any suitable approach may be used without detracting from the invention.

The audiovisual rendering apparatus further comprises a second receiver 209 which is a metadata receiver arranged to receive metadata for the audiovisual items. The metadata in particular comprises position data for one or more of the audiovisual items. The metadata may include input positions which indicate a position for one or more of the audiovisual items.

The received audiovisual data may comprise audio and/or visual data describing the scene. The audiovisual data specifically comprises audiovisual data for a set of audiovisual items corresponding to audio sources and/or visual objects in the scene. Some audio items may represent localized audio sources in the scene which are associated with a specific position and/or orientation in the scene (where the position and/or orientation may be dynamically changing for a moving object). Visual data may comprise data describing scene objects allowing a visual representation of these to be generated and represented in an image/video presented to the user (typically a 3D image using separate displays of a headset).

Often, an audio element may represent audio generated by a specific scene object in the virtual scene and may thus represent an audio source at a position corresponding to that of the scene object (e.g. a human speaking). In such cases, the same position data/indication may be included and used both for an audio item and the corresponding visual scene object (and similarly for orientation).

Other elements may represent more distributed or diffuse audio sources, such as e.g. ambient or background noise which may be diffuse. As another example some audio elements may fully or partially represent non-spatially localized components of audio from localized audio sources, such as for example a diffuse reverberation from a spatially well defined audio source.

Similarly, some visual scene objects may have extended positions and e.g. the position data may indicate a center or reference position for the scene object.

The metadata may comprise pose data that indicates a position and/or orientation of the audiovisual items and specifically the position and/or orientation of an audio source and/or a visual scene object or element. The pose data may for example include absolute position and/or orientation data defining a position of each, or at least some of the items.

The poses are provided with reference to an input coordinate system, i.e. the input coordinate system is the reference coordinate system for the pose indications provided in the metadata received by the second receiver. The input coordinate system is typically one that is fixed with reference to the scene being represented/rendered. For example, the scene may be a virtual (or real) scene in which audio sources and scene objects are present at positions that are provided with reference to the scene, i.e. the input coordinate system is typically a scene coordinate system for the scene being represented by the audiovisual data.

In order to provide user representation of the scene, the scene will be rendered from a viewer or user pose, i.e. the scene will be rendered as it would be perceived at a given viewer/user pose in the scene and with the audio and visual rendering providing the audio and images that would be perceived for that viewer pose.

The rendering by the renderer 203 is performed relative to a rendering coordinate system which is fixed with respect to the user's head and head movements. The reproduction of the rendered audio signals is typically a head worn or mounted reproduction device such as headphones/earphones and individual displays for the eyes. Typically, the reproduction is by a headset device comprising audio and video reproduction means. The renderer is arranged to generate the rendered audiovisual items with reference to the reproduction device/means, and it is assumed that the user's pose is constant/fixed with reference to the reproduction device/means. For example, the position of an audio source is determined relative to the headphones (i.e. the position in the rendering coordinate system) and the appropriate HRTF filters for that position are retrieved and used to render the audio signals such that the audio sources is perceived to arrive from the required relative position in the rendering coordinate system. Similarly, for a given scene object, the relative position with respect to the displays is determined (i.e. the position in the rendering coordinate system) and images corresponding to the views from respectively the left and eye poses relative to this position.

The rendering coordinate system may thus be considered to be a coordinate system that is fixed to the head of the user, and specifically as a rendering coordinate system which is independent of head movements or indeed pose changes of the user. The reproduction device (whether audio, visual, or both audio and visual) are assumed/considered to be fixed with respect to the user head and thus with respect to the rendering coordinate system.

The rendering coordinate system being fixed with respect to the user head movement may be considered to correspond to a reproduction coordinate system fixed with respect to a reproduction device for reproducing the rendered audiovisual items. The term rendering coordinate system may be equivalent to reproduction device/means coordinate system and may be replaced thereby. Similarly, the term 'rendering coordinate system being fixed with respect to the user head movement' may be equivalent to "reproduction device/means coordinate system fixed with respect to a reproduction device for reproducing the rendered audiovisual items" and may be replaced thereby.

As the renderer performs the rendering based on poses with reference to a rendering coordinate system and the poses for the audiovisual items are provided with reference to an input coordinate system, the audiovisual rendering apparatus comprises a mapper 211 which is arranged to map the input positions in the input coordinate system to rendering positions in the rendering coordinate system.

The audiovisual rendering apparatus comprises a head movement data receiver 213 for receiving user head movement data indicative of user head movement. The user head movement data may be indicative of the user's head movement in the real world and is typically provided with reference to a real world coordinate system. The head movement data may be indicative of absolute or relative movement of the user's head in the real world and may specifically reflect absolute or relative user pose changes with respect to a real world coordinate system. The head movement data may be indicative of a change (or no change) in head pose (orientation and/or position), and may also be referred to as head pose data.

It will be appreciated that many different possible approaches for detecting and representing head movement are known and that any suitable approach may be used without detracting from the invention. The head movement data receiver 213 may specifically receive head movement data from a VR headset or VR head movement detector as is known in the art.

The mapper 211 is coupled to the head movement data receiver 213 and receives the user head movement data. The mapper is arranged to perform the mapping between the input positions in the input coordinate system and the rendering positions in the rendering coordinate system in response to the user head movement data. For example, the mapper 211 may continuously process the user head movement data to continuously track a current user pose in a real world coordinate system. The mapping between input poses and the rendering poses may then be based on the user poses.

For example, in many applications, it is desired that the user is provided with an experience as if he is present in the three dimensional scene being represented. Thus, the audio and images rendered are desired to reflect user poses that follow the user head movements. Accordingly, it is desired that the audiovisual items are rendered such that they are perceived to be fixed with reference to the real world as this results in the real world movements to be reproduced in the rendering of the (typically virtual) scene.

In such a scenario, the mapping of the input poses to rendering poses, is such that the audiovisual items appear to be fixed with respect to the real world, i.e. they are rendered to be perceived as being fixed with reference to the real world. Thus, the same input pose is mapped to different rendering poses to reflect the change in the user head pose. For example, if the user turns his head by, say, 30°, a real world scene is with reference to the user rotated by −30°. The mapper 211 may perform a corresponding change such that the mapping from input poses to rendering poses is modified to include an additional 30° rotation relative to the situation prior to the user head rotation. As a consequence, the audiovisual items will be at different poses in the rendering coordinate system but will be perceived to be at the same real world pose. Thus, the mapping may be dynamically changed such that it is perceived that the audiovisual items are fixed with reference to the real world and thus a very natural experience is provided.

For example, to create the illusion of an immersive virtual world, three dimensional audio and/or visual rendering is typically controlled by means of head tracking where the rendering is compensated for head poses, particularly comprising head orientation changes (in 3 degrees of spatial freedom or 3-DoF such as yaw, pitch roll). The rendering is such that the audiovisual items are perceived to be fixed relative to the user. The effect of this head tracking and consequent rendering adaptation is a high realism and out-of-head perception of the rendered content, compared to a static rendering.

However, another approach is to map the input poses to rendering poses that are fixed with respect to the rendering coordinate system. This may for example be done by the mapper 211 applying a fixed mapping of input poses to rendering poses where the mapping is independent of the head movement data and specifically where changes in the user pose do not result in a changed mapping between the input poses and rendering poses. The effect of such a mapping is effectively that the perceived scene moves together with the head, i.e. it is static with respect to the user's head. Although this may seem unnatural for most scenes, it may be advantageous in some scenarios. For example, it may provide a desirable experience for music or for listening to a sound that is not part of the scene, such as e.g. a narrator.

It is possible to apply different approaches to different audiovisual items. In MPEG terminology, the terms "fixed to head orientation" or "not-fixed to head orientation" are used to refer to audio items that are to be rendered either to completely follow or ignore the user movements.

For example, an audio item may be considered to be "Not-fixed to head" which means that it is an audio element that is intended to have a fixed location in the (virtual or real) environment, and so their rendering is dynamically adapted to (changes in) the user's head orientation. Another audio item may be considered to be "fixed to head" which means that it is an audio item intended to have a fixed location relative to the user's head. Such audio items may be rendered independently of the listener pose. Hence the rendering of such audio items does not take into account (changes in) the user's head orientation, in other words such audio items are audio elements for which the relative position does not change when the user turns his head (e.g. non spatial audio such as ambient noise or e.g. music that is intended to follow the user without changing a relative position).

In the described system, the second receiver 209 is arranged to receive metadata that also includes a rendering category indication for at least some of the audiovisual items. A rendering category indication is indicative of a rendering category from a set of rendering categories and the rendering of an audiovisual item is performed in accordance with the rendering category indicated for the audiovisual item. The different rendering categories may define different rendering parameters and operations.

The rendering category indications may be any indication that may be used to select a rendering category from the set of rendering categories. In many embodiments, it may be data that is provided only for the purpose of selecting a rendering category and/or may be data that directly specifies one category. In other embodiments, a rendering category indication may be an indication that may also provide additional information or provide some description of the corresponding audiovisual item. In some embodiments, the rendering category indication may be one parameter that is considered when selecting a rendering category and other parameters may also be taken into consideration.

As a specific example, in some embodiments, audio items may be encoded audio data, such as encoded audio signals where the audio items may be different types of audio items including different types of signals and components, and indeed in many embodiments the metadata receiver 201 may receive meta data which defines different types/formats of audio. For example, the audio data may include audio represented by audio channel signals, individual audio objects, Higher Order Ambisonics (HOA) etc. Metadata may be included as part of the audio items or separately from the audio items that describe the audio type for each audio item. This metadata may be a rendering category indication and may be used to select the appropriate rendering category for the audio item.

The rendering categories are specifically associated with different reference coordinate systems and specifically each rendering category is linked with a coordinate system transform from a real world coordinate system to a category coordinate system. Specifically, for each category, a coordinate system transform may be defined which can transform a real world coordinate system, such as specifically the real world coordinate system with reference to which the head movement data is provided, into a different coordinate system that is given by the transform. As different categories have different coordinate system transforms, they will be linked to different category reference systems.

The coordinate system transform is typically for one, some, or all of the categories a dynamic coordinate system transform. Thus, the coordinate system transform is not typically a fixed or static coordinate system transform but may vary with time and in dependence on different parameters. For example, as will be described in more detail later, the coordinate system transform may be dependent on dynamically changing parameters, such as e.g. user torso movements, external device movements, and/or indeed even the head movement data. The coordinate system transform for a category is thus in many embodiments a temporally varying coordinate system transform which is dependent on a user movement parameter. The user movement parameter may be indicative of a movement of the user relative to a real world coordinate system.

The mapping performed by the mapper 211 for a given audiovisual item is dependent on the category coordinate system for the rendering category to which the audiovisual item is indicated to belong. Specifically, based on the rendering category indication, the mapper 211 may determine a rendering category intended to be used for the rendering of the audiovisual item. The mapper may then determine the coordinate system transform linked to the selected category. The mapper 211 may then proceed to perform the mapping from input poses to rendering poses such that these correspond to fixed poses in the category coordinate system resulting from the selected coordinate system transform.

Thus, the category coordinate system can be considered a reference coordinate system with reference to which the audiovisual items are rendered to be fixed. The category coordinate system may also be referred to as a reference coordinate system or a fixed reference coordinate system (for the given category).

In many embodiments, one rendering category may correspond to a rendering where the audio sources and scene objects represented by the audiovisual items are fixed with respect to the real world as previously described. In such embodiments, the coordinate system transform is such that the category coordinate system for the category is aligned with the real world coordinate system. For such a category, the coordinate system transform may be a fixed coordinate system transform, and e.g. may be a unity one-to-one mapping of the real world coordinate system. Thus, the category coordinate system may effectively be the real world coordinate system or e.g. a fixed, static translation, scaling, and/or rotation.

In many embodiments, one rendering category may correspond to a rendering where the audio sources and scene objects represented by the audiovisual items are fixed with respect to the head movement, i.e. to the rendering coordinate system. In such embodiments, the coordinate system transform is such that the category coordinate system for the category is aligned with the user's head/the reproduction device/the rendering coordinate system. For such a category, the coordinate system transform may be a coordinate system transform that fully follows the user head movement. For example, any rotation of the head is followed by a corresponding rotation in the coordinate system transform, any position change in the user's head is followed by the same change in the coordinate system transform. Thus, in accordance with such a rendering category, the coordinate system transform is dynamically modified to follow the head movement data such that the resulting category coordinate system is aligned with the rendering coordinate system thereby resulting in a fixed mapping from the input coordinate system to the rendering coordinate system as previously described.

Although not essential, in many embodiments, the rendering categories may accordingly include a category where the audiovisual item is rendered fixed with respect to the real world coordinate system and one where it is rendered fixed with respect to the rendering coordinate system. However, in the described system, one or more of the rendering categories include a rendering category where the audiovisual item are fixed in a coordinate system that is neither the real world coordinate system nor the rendering coordinate system, i.e. a rendering category is provided where the rendering of the audiovisual item is neither fixed in the real world nor fixed relative to the user's head. Accordingly, at least one category coordinate system is variable with respect to a real world coordinate system and the rendering coordinate system. Specifically, the coordinate system is different from the rendering coordinate system and from the real world coordinate system, and indeed the difference between these and the category coordinate system are not constant but may change.

Hence, at least one rendering category may provide a rendering which is not fixed to the real world nor to the user. Rather, it may in many embodiments provide an in-between experience.

For example, the coordinate system transform may be such that the corresponding coordinate system is fixed with respect to the real world except for when an update criterion is met. However, if the criterion is met, the coordinate system transform may adapt to provide a different relationship between the real world coordinate system and the category coordinate system. For example, the mapping may be such that the audiovisual is rendered fixed with respect to the real world coordinate system, i.e. the audiovisual item appears to be at a fixed position. However, if the user rotates their head by more than a given amount, the relationship between the real world coordinate system and the category coordinate system is changed to compensate for this rotation. E.g. as long as the user's head movement is less than, say, 20° the audiovisual item is rendered such that it is at a fixed position. However, if the user moves his head by more than 20°, the category coordinate system is rotated by 20° with respect to the real world coordinate system. This may provide an experience where the user perceives a natural three dimensional experience with respect to the rendered audiovisual item as long as movements are sufficiently small. However, for a large head movement, the rendering of the audiovisual item is realigned with the modified head position.

As a specific example, an audio source corresponding to a narrator may initially be presented to be positioned directly in front of the user. For small user movements, the audio is rendered such that the narrator is perceived to be static at the same position. This provides a natural experience and perception and in particular provides an out of head perception of the narrator. However, if the user rotates his head by more than e.g. 20° from the original direction towards the narrator audio source, the system adapts the mapping to reposition the narrator audio source in front of the user's new orientation. For small movements around this point, the narrator audio source is rendered at this new fixed position (with respect to the real world coordinate system). If the movement again exceeds a given threshold with respect to this new audio source position, an update in the category coordinate system, and thus the perceived position of the narrator audio source, may again be carried out. Thus, the user may be provided with a narrator which is fixed with relation to the real world for smaller movements but follow the user for larger movements. In the described example, it may allow the narrator to be perceived to be fixed and provide appropriate spatial cues with respect to head movement, yet always be substantially in front of the user (even if e.g. the user turns a full 180°).

In the approach, the metadata comprises rendering category indicators for a plurality of audiovisual items thereby allowing the source end to control the flexible rendering at the receiving end with the rendering being specifically adapted to the individual audiovisual item. For example, different spatial rendering and perception may be applied to e.g. items corresponding to background music, narration, audio sources corresponding to specific objects fixed in the scene, dialogue, etc.

In some embodiments, the coordinate system transform for a rendering category is dependent on the user head movement data. Thus, in some embodiments, at least one parameter that varies the coordinate system transform is dependent on the user head movement data.

In many embodiments, the coordinate system transform may be dependent on a user head pose property or parameter determined from the user head movement data. For example, as described before, if the user head pose indicates a rotation by more than a certain amount, the coordinate system transform may adapt to include a rotation corresponding to that amount. As another example, the mapper 211 may detect that the user has maintained a (sufficiently) constant pose for longer than a given duration and if so the coordinate system transform may adapt to position the audiovisual item in a given position in the rendering coordinate system, i.e. with a specific position relative to the user (e.g. directly in front of the user).

In some embodiments, the coordinate system transform is dependent on an average head pose. In particular, in some embodiments, the coordinate system transform may be such that the category coordinate system is aligned with the average head pose. In some embodiments, the coordinate system transform may be such that the category coordinate system is fixed with respect to the average head pose.

The average head pose may for example be determined by low pass filtering a head pose measure by a low pass filter with a suitable cut-off frequency, such as specifically by applying a non-weighted averaging over a window of a suitable duration.

In some embodiments, the reference for rendering may, for one or more rendering categories, be chosen to be the average head orientation h. This creates the effect that the audiovisual item follows slower, longer lasting head orientation changes, making the sound source appear to stay at the same spot in relation to the head (e.g. in front of the face), but fast head movements will make the audiovisual item seem fixed with respect to the real world, (and thus also seem fixed in the virtual world) rather than relative to the head. The typical small and fast head movements during daily life will therefore still create an immersive and out-of-head-illusion while still allowing an overall perception of the audiovisual item following the user.

In some embodiments, the adaptation and tracking may be made non-linear such that if the head rotates significantly, the average head orientation reference is e.g. 'clipped' to not deviate more than a certain maximum angle relative to the instantaneous head orientation. For example, if this maximum is 20 degrees, then as long as the head 'wiggles' within those +/−20 degrees, the out of head experience is realized. If the head rotates rapidly and goes beyond the maximum, the reference will follow the head orientation (lagging at max 20 degrees), and once the movement stops, the reference becomes stable again.

In some embodiments, at least one rendering category is associated with a coordinate system transform that is dependent on a user torso pose. In such embodiments, the audiovisual rendering apparatus may comprise a torso pose receiver 215 which is arranged to receive user torso pose data indicative of a user torso pose.

The torso pose may e.g. be determined by a dedicated inertial sensor unit positioned or worn on the torso. As another example, the torso pose may be determined by the sensors in a smart device, such as smartphone, while it is worn in the pocket. As yet another example, coils could be placed on respectively the torso and head of a user and head movements relative to torso can be determined based on changes in the coupling between these.

In such embodiments, at least one parameter that varies the coordinate system transform is dependent on the torso pose data.

In many embodiments, the coordinate system transform may be dependent on a torso pose data property or parameter determined from the torso pose data.

For example, if the torso pose data pose indicates a rotation of the torso by more than a certain amount, the coordinate system transform may adapt to include a rotation corresponding to that amount. As another example, the mapper 211 may detect that the user has maintained a (sufficiently) constant torso pose for longer than a given duration and if so the coordinate system transform may adapt to position the audiovisual item in a given position in the rendering coordinate system where the position corresponds to the torso pose.

In particular, in some embodiments, the coordinate system transform may be such that the category coordinate system is aligned with the user torso pose. In some embodiments, the coordinate system transform may be such that the category coordinate system is fixed with respect to the user torso pose. Thus, in some embodiments, the audiovisual item may be rendered to follow the user torso, and thus a perception and experience may be provided where the audiovisual item follows the users movement of his entire body yet appear to be fixed with respect to head movements relative to the torso. This may provide a desirable experience of both an out-of-head perception and a rendering of an audiovisual item that follows the user.

In some embodiments, the coordinate system transform may depend on an average torso pose. The average torso pose may for example be determined by low pass filtering a head pose measure by a low pass filter with a suitable cut-off frequency, such as specifically by applying a non-weighted averaging over a window of a suitable duration.

Thus, in some embodiments, one or more of the rendering categories may employ a coordinate system transform that provides a reference for the rendering which is aligned with the instantaneous or average chest/torso orientation t. In this way, the audiovisual item may appear to stay in front of the user's body rather than in front of the user's face. By rotating the head relative to the chest/torso, the audiovisual item can still be perceived from various directions, again greatly adding to the immersive out-of-head experience.

In some embodiments, the coordinate system transform for a rendering category is dependent on device pose data indicative of a pose of an external device. In such embodiments, the audiovisual rendering apparatus may comprise a device pose receiver 217 which is arranged to receive device pose data indicative of a device torso pose.

The device may for example be a device (assumed to be) worn, carried, attached, or otherwise fixed with respect to the user. In many embodiments, the external device may for example be a mobile phone or personal device, such as e.g. a smartphone in the pocket, body mounted device, or handheld device (e.g. a smart device used for viewing the visual VR content).

Many devices include gyro's, accelerometers, GPS receivers etc., that allow a relative or absolute orientation of the device. The device may then determine a current relative or absolute orientation and transmit it to the device pose receiver 217 using a suitable communication which typically is wireless. For example, communication may be via WiFi or Bluetooth connections.

In such embodiments, at least one parameter that varies the coordinate system transform is dependent on the device pose data.

In many embodiments, the coordinate system transform may be dependent on a device pose data property or parameter determined from the device pose data.

For example, if the device pose data pose indicates a rotation of the device by more than a certain amount, the coordinate system transform may adapt to include a rotation corresponding to that amount. As another example, the mapper 211 may detect that the device has maintained a (sufficiently) constant torso pose for longer than a given duration, and if so, the coordinate system transform may adapt to position the audiovisual item in a given position in the rendering coordinate system where the position corresponds to the device pose.

In particular, in some embodiments, the coordinate system transform may be such that the category coordinate system is aligned with the device pose. In some embodiments, the coordinate system transform may be such that the category coordinate system is fixed with respect to the device pose. Thus, in some embodiments, the audiovisual item may be rendered to follow the device pose, and thus a perception and experience may be provided where the audiovisual item follows the device movement. The device may in many practical user scenarios provide a good indication of a user pose reference. For example, a body worn device or e.g. a smartphone in a pocket may provide a good reflection of movement of the user as a whole. It may provide a good reference for determining relative head movements and thus may provide an experience combining both a realistic response to head movements while allowing audiovisual item to follow the larger movements of a user.

Further, the use of an external device as reference may be highly practical and provide a reference leading to a desirable user experience. The approach may be based on devices that are often already worn or carried by a user and which comprise the required functionality for determining and transmitting a device pose. For example, most people currently carry a smartphone that already comprises accelerometers etc. for determining a device pose and communication means (such as Bluetooth) suitable for transmitting device pose data to the audiovisual rendering apparatus.

In some embodiments, the coordinate system transform may depend on an average device pose. The average device pose may for example be determined by low pass filtering a device pose measure by a low pass filter with a suitable cut-off frequency, such as specifically by applying a non-weighted averaging over a window of a suitable duration.

Thus, in some embodiments, one or more of the rendering categories may employ a coordinate system transform that provides a reference for the rendering which is aligned with the instantaneous or average device orientation. In this way, the audiovisual item may appear to stay at a fixed position relative to the device such that it moves when the device is moved yet stays fixed with respect to head movements thereby providing a more naturally feeling and immersive out-of-head experience.

The approach may thus provide for an approach where metadata can be used to control rendering of audiovisual items such that these can be individually controlled to provide different user experiences for different audiovisual items. The experience includes one or more options that provide perceptions of audiovisual items that are neither fully fixed in the real world or fully follow the user (fixed to the head). Specifically, in-between experiences can be provided where the audiovisual item to some extent are rendered fixed with reference to the real world and to some extent follow the user's movements.

It will be appreciated that the possible rendering categories may in some embodiments be predetermined with each category being associated with a predetermined coordinate system transform. In such embodiments, the audiovisual rendering apparatus may store coordinate system transforms, or equivalently when appropriate directly store mappings corresponding to the coordinate system transform, for each category. The mapper 211 may be arranged to retrieve the stored coordinate system transform (or mapping) for the selected rendering category and apply this when performing the mapping for the audiovisual item.

For example, for a first audiovisual item, the rendering category indicator may indicate that it should be rendered according to a first category. The first category may be one for rendering audiovisual items fixed to the head pose, and thus the mapper may retrieve a mapping that provides a fixed one to one mapping between input pose and rendering pose. For a second audiovisual item, the rendering category indicator may indicate that it should be rendered according to a second category. The second category may be one for rendering audiovisual items fixed to the real world, and thus the mapper may retrieve a coordinate system transform that adapts the mapping such that head movement is compensated resulting in the rendering poses corresponding to fixed positions in real space. For a third audiovisual item, the rendering category indicator may indicate that it should be rendered according to a third category. The third category may be one for rendering audiovisual items fixed to a device pose or torso pose. The mapper may retrieve a coordinate system transform or mapping that adapts the mapping such that head movement relative to the device or torso pose is compensated resulting in a rendering of the audiovisual item which is fixed relative to the device or torso pose.

It will be appreciated that whereas the different rendering categories are associated with different coordinate system transforms such that the mapping results in the rendering positions being fixed in relation to the category coordinate system, the mapper 211 need not explicitly determine such a coordinate system transform or category coordinate system. Rather, in typical embodiments, a mapping function is defined for the individual rendering category such that the resulting rendering poses are fixed relative to the category coordinate system. For example, a mapping function that is a function of a head pose relative to a device (or torso) pose may be used to directly map input positions to rendering positions that are fixed with respect to a category coordinate system that is fixed with respect to the device (or torso) pose.

In some embodiments, the metadata may comprise data partly or fully characterizing, describing, and or defining one or more of the plurality of rendering categories. For example, the metadata may in addition to the rendering category indications also include data describing the coordinate system transform and/or the mapping function that is to be applied for one or more of the categories. For example, the metadata may indicate that a first rendering category requires a fixed mapping from input positions to rendering positions, a second category requires a mapping that compensates fully for head movement such that the items appear fixed with respect to the real world, and a third rendering category where the mapping should be compensated for head movement relative to an average head movement such that an in-between experience is perceived where items appear fixed for smaller and faster head movements but also appear to follow the user for slow average movements.

In different embodiments, different approaches and data may be used as rendering category indications. In some embodiments, each category may e.g. be associated with a category number and the rendering category indication may directly provide the number of the category to be used for the audiovisual item.

In many embodiments, the rendering category indication may indicate a property or characteristic of the audiovisual item and this may be mapped to a specific rendering category indication.

In some embodiments, a rendering category indication may specifically indicate whether the audiovisual item is a diegetic or non-diegetic audiovisual item. A diegetic audiovisual item may be one that belongs to the scene e.g. of a film or story being presented; in other words, diegetic audiovisual item originates from sources within film, story etc (e.g. an actor in the screenplay, a bird with its sounds in a nature movie etc). Non-diegetic audiovisual items may be items that originate from outside said film or story (e.g. a director's audio commentary, mood music etc). In many scenarios, a diegetic audiovisual item may correspond to a "not-fixed to head orientation" and a non-diegetic audiovisual item may correspond to a "fixed to head orientation" in accordance with MPEG terminology.

In some embodiments, there may indeed only be two rendering categories and specifically one may correspond to rendering of audiovisual items that are indicated to be diegetic and one may correspond to rendering of audiovisual items that are indicated to be non-diegetic.

Figure 3:
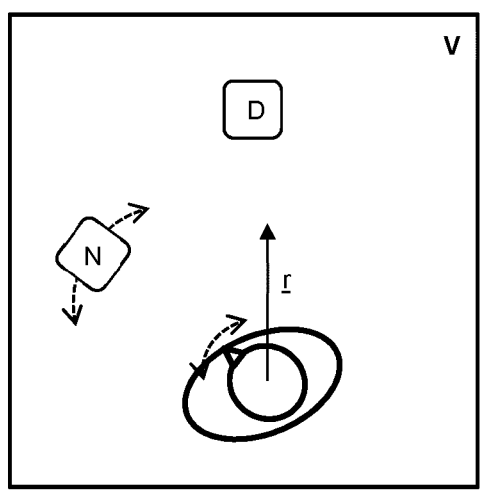
FIG. 3 illustrates an example of a possible rendering approach by the audiovisual rendering apparatus of FIG. 2.

For example, in some applications and systems, diegetic signaling may be conveyed downstream to the audiovisual rendering apparatus, and that the desired rendering behavior may depend depends on this signaling, as exemplified with respect to FIG. 3:

By using head tracking with real-world orientation as reference, a diegetic source D is desired to appear to stay firm in its location in the virtual world V and therefore should be rendered to appear fixed with reference to the real world. In a given example for a film application, if an actor's voice is rendered directly in front of the user, and the user rotates the head 50 degrees left, the sound will be rendered to the headphones projected 50 degrees to the right thereby, making it seem to stay in the same virtual location.

A non-diegetic sound source N may instead be rendered independently of head orientation. In other words, the audio stays at a 'hard coupled' fixed position relative to the head (e.g. in front of it), and rotates with the head. This is achieved by not applying a head orientation dependent mapping to the audio but rather using a fixed mapping from input positions to rendering positions. In the film example, the director's commentary audio could be rendered precisely in front of the user, and any head movement will have no effect on this, i.e. the sound stays in front of the head.

The audiovisual rendering apparatus of FIG. 2 is arranged to provide a more flexible approach where at least one selectable rendering category allows an rendering of audiovisual items that allows the rendering of audiovisual items to be both fixed with respect to the real/virtual world for some movements yet follow the user for other movements. The approach may specifically be applied to non-diegetic audiovisual items.

Figure 4:
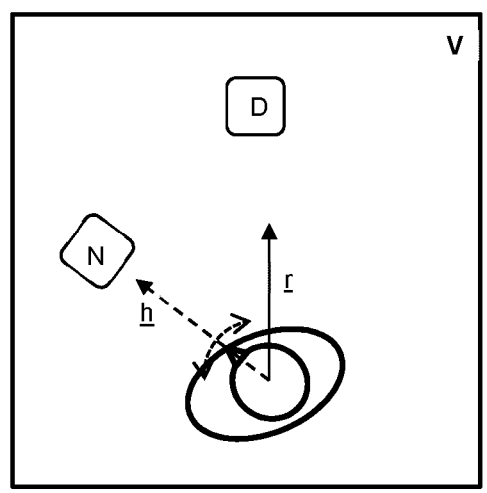
FIG. 4 illustrates an example of a possible rendering approach by the audiovisual rendering apparatus of FIG. 2.

In the specific example, alternative or additional options for rendering non-diegetic sound sources may include one or more of the following:

A reference for rendering can be chosen to be the average head orientation/pose h (as illustrated in FIG. 4). This creates the effect that the non-diegetic sound source follows slower, longer lasting head orientation changes, making the sound source appear to stay at the same spot in relation to the head (e.g. in front of the face), but fast head movements will make the non-diegetic sound source seem fixed in the virtual world (rather than relative to the head). The typical small and fast head movements during daily life will therefore still create an immersive and out-of-head-illusion.

As a refinement for some embodiments, since non-diegetic audio is typically desired to at least closely stay at the same virtual position, the tracking may be made non-linear such that if the head rotates significantly, the average head orientation reference is e.g. 'clipped' to not deviate more than a certain maximum angle relative to the instantaneous head orientation. For example, if this maximum is 20 degrees, then as long as the head 'wiggles' within those +/−20 degrees, the out of head experience is realized. If the head rotates rapidly and goes beyond the maximum, the reference will follow the head orientation (lagging at max 20 degrees), and once the movement stops, the reference becomes stable again.

Figure 5:
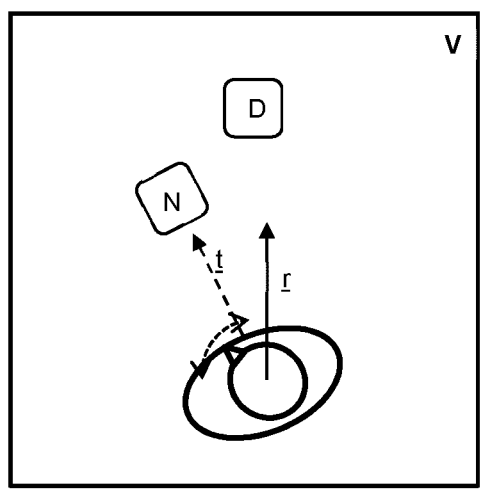
FIG. 5 illustrates an example of a possible rendering approach by the audiovisual rendering apparatus of FIG. 2.

A reference for the head tracking can be chosen to be the instantaneous or average chest/torso orientation/pose t (as illustrated in FIG. 5). In this way, the non-diegetic content will appear to stay in front of the user's body rather than the user's face. By rotating the head relative to the chest/torso, the non-diegetic content can still be heard from various directions, again greatly adding to the immersive out-of-head experience.

A reference for the head tracking can be chosen to an instantaneous or average orientation/pose of an external device such as a mobile phone or body worn device. In this way, the non-diegetic content will appear to stay in front of the device rather than the user's face. By rotating the head relative to the device, the non-diegetic content can still be heard from various directions, again greatly adding to the immersive out-of-head experience.

In some embodiments, the rendering may be arranged to operate in different modes depending on the user movement. For example, if the user movement meets a movement criterion, the audiovisual rendering apparatus may operate in a first mode and if it does not it may operate in a second mode. In the example, the two modes may provide different category coordinate systems for the same rendering category indication, i.e. dependent on the user movement, the audiovisual rendering apparatus may render a given audiovisual item with a given rendering category indication fixed with reference to different coordinate systems.

In some embodiments, the mapper 211 may be arranged to select the rendering category for a given rendering category indication in response to a user movement parameter which is indicative of the movement of the user. Thus, different rendering categories may be selected for a given audiovisual item and rendering category indication value depending on the user movement parameter. Specifically, if the user movement parameter meets a first criterion, a given linking between the possible rendering category indication values and a set of rendering categories may be used to select the rendering category for a received rendering category indication. However, if the criterion is not met (or e.g. a different criterion is met), the mapper 211 may use a different linking between the possible rendering category indication values and the same or a different set of rendering categories to select the rendering category for a received rendering category indication.

The approach may for example enable the audiovisual rendering apparatus to provide different rendering and experiences for a mobile user and a stationary user.

It some embodiments, the selection of the rendering category may also be dependent on other parameters, such as e.g. a user setting or a configuration setting by the application (e.g. an app on a mobile device).

In another approach, the mapper may be arranged to determine a coordinate system transform between the real world coordinate system user as a reference for the coordinate system transform of the selected category and the coordinate system with reference to which the user head movement data is provided in response to a user movement parameter indicative of a movement of the user.

Thus, in some embodiments, an adaptation of the rendering may be introduced by the coordinate system transform of the rendering category being with respect to a reference that may vary with respect to the (typically real world) coordinate system which indicates the head movement. For example, based on the user movement, some compensation may be applied to the head movement data, e.g. to offset for some movement of the user as a whole. As an example, if a user is, say, on board a boat, the user head movement data may not only indicate the movement of the user with respect to the body, or the body with respect to the boat, but may also reflect the movement of the boat. This may be undesirable and accordingly the mapper 211 may compensate the head movement data for user movement parameter data which reflects the component of the user's movement that is due to the movement of the boat. The resulting modified/compensated head movement data is then given with respect to a coordinate system that has been compensated for the movement of the boat and the selected category coordinate system transform may be applied directly to this modified coordinate system to achieve the desired rendering and user experience.

It will be appreciated that the user movement parameter may be determined in any suitable way. For example, in some embodiments, it may be determined by dedicated sensors providing relevant data. For example, accelerometers and/or gyroscopes may be attached to a vehicle, such as a car or boat, which carries the user.

In many embodiments, the mapper may be arranged to determine the user movement parameter in response to the user head movement data itself. For example, a long term averaging, or underlying movement analysis identifying e.g. periodic components (e.g. corresponding to waves moving a boat), may be used to determine a user parameter indicative of a user movement parameter.

In some embodiments, the coordinate system transform for two different rendering categories may be dependent on user head movement data but with the dependencies having different temporal averaging properties. For example, one rendering category may be associated with a coordinate system transform that is dependent on an average head movement but with a relatively low averaging time (i.e. a relatively high cut-off frequency for the averaging low pass filter) whereas another rendering category is also associated with a coordinate system transform that is dependent on an average head movement but with a higher averaging time (i.e. a relatively low cut-off frequency for the averaging low pass filter).

Figure 6:
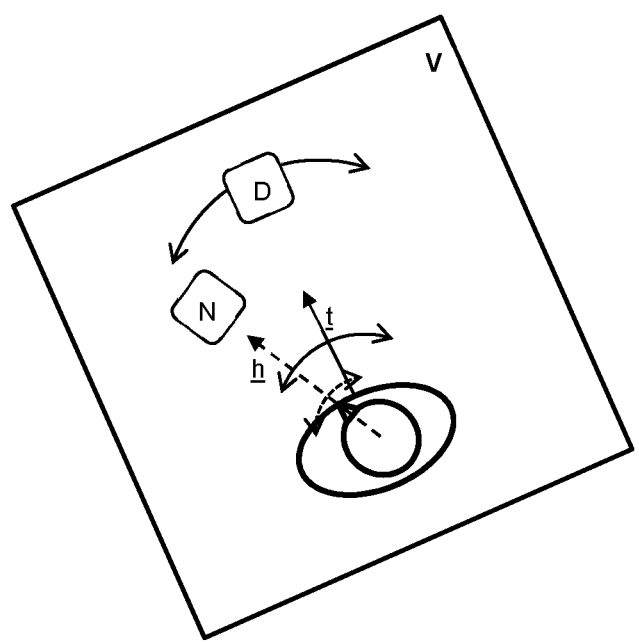
FIG. 6 illustrates an example of a possible rendering approach by the audiovisual rendering apparatus of FIG. 2.
Figure 7:
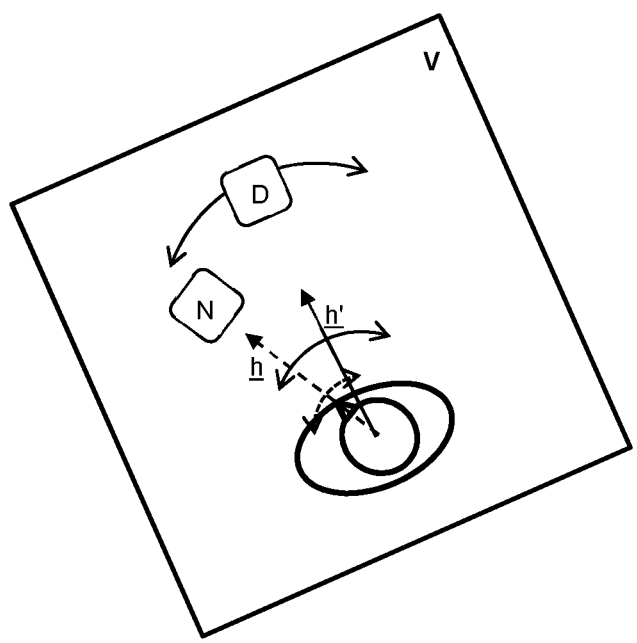
FIG. 7 illustrates an example of a possible rendering approach by the audiovisual rendering apparatus of FIG. 2.

As an example, the mapper 211 may evaluate the head movement data against a criterion that reflects a consideration that the user is positioned in a static environment. For example, a low pass filtered position change may be compared to a given threshold and if below the threshold, the user may be considered to be in a static environment. In this case, the rendering may be as in the specific example described above for diegetic and non-diegetic audio items. However, if the position change is above the threshold, the user may be considered to be in a mobile setting, such as during a stroll, or using transportation such as a car, train or plane. In this case, the following rendering approaches may be applied (see also FIGS. 6 and 7):

Non-diegetic sound sources N can be rendered using the average head orientation h as reference, to keep the non-diegetic sound source principally in front of the face, but still allowing for small head movements to create an 'out of head' experience. In other examples, e.g. the user torso or device poses may be used as references. Thus, this approach may correspond to the approach that may be used for diegetic sound sources in the static case.

Diegetic sound sources D may also be rendered using the average head orientation h as a reference but with a further offset corresponding to a longer term average head orientation h'. Thus, in this case, the diegetic virtual sound sources will seem to be at fixed locations relative to the virtual world V but with this virtual world V appearing to 'move along with the user', i.e. it maintains a more or less fixed orientation with respect to the user. The averaging (or other filter process) used to obtain h' from instantaneous head orientation is typically chosen substantially slower than the one used for h. Thus, non-diegetic sources will follow more rapid head movements, while the diegetic content (and the virtual world V as a whole) will take a while to reorient with the user's head.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must

The invention claimed is:

1. An audiovisual apparatus comprising:
   a first receiver circuit, wherein the first receiver circuit is arranged to receive audiovisual items;
   a metadata receiver circuit,
      wherein the metadata receiver circuit is arranged to receive metadata,
      wherein the metadata comprises input poses and rendering category indications for each of a portion of the audiovisual items,
      wherein the input poses are provided with reference to an input coordinate system,
      wherein the rendering category indications indicate a rendering category from a plurality of rendering categories;
   a second receiver circuit,
      wherein the second receiver circuit is arranged to receive user head movement data,
      wherein the user head movement data is indicative of a head movement of a user;
   a mapper circuit,
      wherein the mapper circuit is arranged to map the input poses to rendering poses in a rendering coordinate system in response to the user head movement data,
      wherein the rendering coordinate system is fixed with respect to the head movement of the user; and
   a renderer circuit, wherein the renderer circuit is arranged to render the audiovisual items using the rendering poses;
      wherein each rendering category is linked with a coordinate system transform from a real world coordinate system to a category coordinate system,
      wherein the coordinate system transform is different for different categories,
      wherein at least one category coordinate system is variable with respect to the real world coordinate system and the rendering coordinate system,
   wherein the mapper circuit is arranged to select a first rendering category from the plurality of rendering categories for a first audiovisual item in response to a rendering category indication for the first audiovisual item,
   wherein the mapper circuit is arranged to map an input pose for the first audiovisual item to rendering poses in the rendering coordinate system that correspond to fixed poses in a first category coordinate system for varying user head movement,
   wherein the first category coordinate system is determined from a first coordinate system transform for the first rendering category.

2. The audiovisual rendering apparatus of claim 1, wherein a second coordinate system transform for a second category is arranged such that a category coordinate system for the second category is aligned with the head movement of the user.

3. The audiovisual rendering apparatus of claim 1, wherein a second coordinate system transform for a second category is arranged such that a category coordinate system for the second category is aligned with the real world coordinate system.

4. The audiovisual rendering apparatus of claim 1, wherein the first coordinate system transform is dependent on the user head movement data.

5. The audiovisual rendering apparatus of claim 4, wherein the first coordinate system transform is dependent on an average head pose.

6. The audiovisual rendering apparatus of claim 5, wherein the first coordinate system transform aligns the first category coordinate system with an average head pose.

7. The audiovisual rendering apparatus of claim 4,
   wherein a second coordinate system transform for a second rendering category is dependent on the user head movement data,
   wherein the dependency on the head movement of the user for the first coordinate system transform and the second coordinate system transform have different temporal averaging properties.

8. The audiovisual rendering apparatus of claim 1, further comprising a third receiver circuit,
   wherein the third receiver circuit is arranged to receive user torso pose data,
   wherein the user torso pose data is indicative of the user torso pose,
   wherein the first coordinate system transform is dependent on the user torso pose data.

9. The audiovisual rendering apparatus of claim 8, wherein the first coordinate system transform aligns the first category coordinate system with a user torso pose.

10. The audiovisual rendering apparatus of claim 1, further comprising a third receiver circuit,
    wherein the third receiver is arranged to receive device pose data,
    wherein the device pose data is indicative of a pose of an external device,
    wherein the first coordinate system transform is dependent on the device pose data.

11. The audiovisual rendering apparatus of claim 10, wherein the first coordinate system transform aligns the first category coordinate system with a device pose.

12. The audiovisual rendering apparatus of claim 1,
    wherein the mapper circuit is arranged to select the first rendering category in response to a user movement parameter,
    wherein the user movement parameter is indicative of a movement of the user.

13. The audiovisual rendering apparatus of claim 1,
    wherein the mapper circuit is arranged to determine a coordinate system transform between the real world coordinate system and a coordinate system for the head movement of the user data in response to a user movement parameter,
    wherein the user movement parameter is indicative of a movement of the user.

14. The audiovisual rendering apparatus of claim 12, wherein the mapper circuit is arranged to determine the user movement parameter in response to the user head movement data.

15. The audiovisual rendering apparatus of claim 1, wherein a portion of rendering category indications are indicative of whether the audiovisual items for a portion of rendering category indications are diegetic or non-diegetic audiovisual items.

16. The audiovisual rendering apparatus of claim 1, wherein the audiovisual items are audio items, wherein the renderer circuit is arranged to generate output binaural audio signals for a binaural rendering device by applying a binaural rendering to the audio items using the rendering poses.

17. A method comprising:

receiving audiovisual items;

receiving metadata,
- wherein the metadata comprises input poses and rendering category indications for each of a portion of the audiovisual items,
- wherein the input poses are provided with reference to an input coordinate system,
- wherein the rendering category indications indicate a rendering category from a plurality of rendering categories;

receiving user head movement data, wherein the user head movement data is indicative of a head movement of a user;

mapping the input poses to rendering poses in a rendering coordinate system in response to the user head movement data, wherein the rendering coordinate system is fixed with respect to the head movement of the user;

rendering the audiovisual items using the rendering poses;
- wherein each rendering category is linked with a coordinate system transform from a real world coordinate system to a category coordinate system,
- wherein the coordinate system transform is different for different categories,
- wherein at least one category coordinate system is variable with respect to the real world coordinate system and the rendering coordinate system;

selecting a first rendering category from the plurality of rendering categories for a first audiovisual item in response to a rendering category indication for the first audiovisual item; and mapping an input pose for the first audiovisual item to rendering poses in the rendering coordinate system that correspond to fixed poses in a first category coordinate system for varying user head movement, wherein the first category coordinate system is determined from a first coordinate system transform for the first rendering category.

18. A computer program stored on a non-transitory medium, wherein the computer program when executed on a processor performs the method as claimed in claim 17.

19. The method of claim 17, wherein a second coordinate system transform for a second category is arranged such that a category coordinate system for the second category is aligned with the head movement of the user.

20. The method of claim 17, wherein a second coordinate system transform for a second category is arranged such that a category coordinate system for the second category is aligned with the real world coordinate system.

* * * * *